Nov. 5, 1929.                M. MONEYRON                1,734,042
                            ROTARY TRANSFORMER
                           Filed April 9, 1928        2 Sheets-Sheet 1
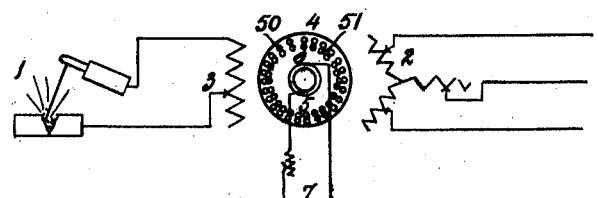
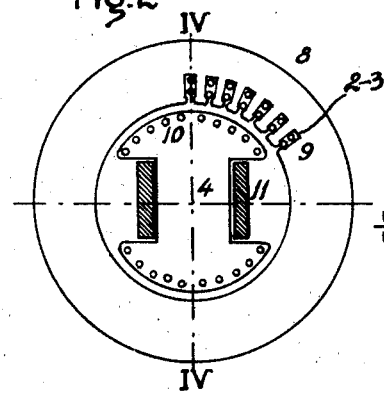
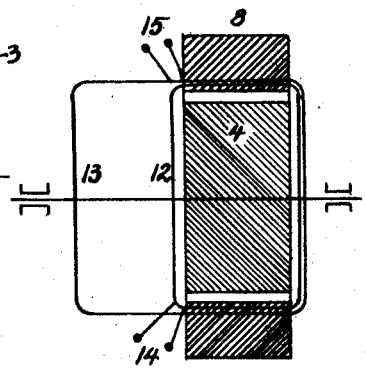
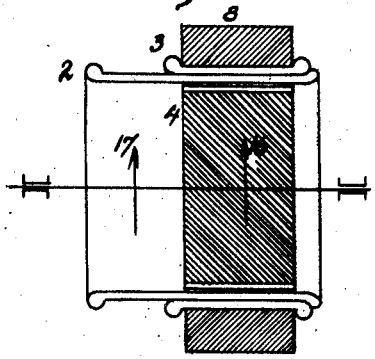
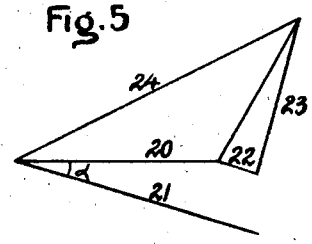
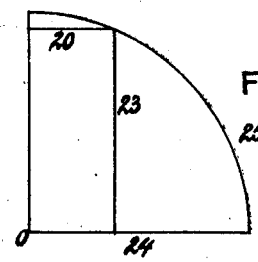
Inventor:
Marcel Moneyron
By
Attorney

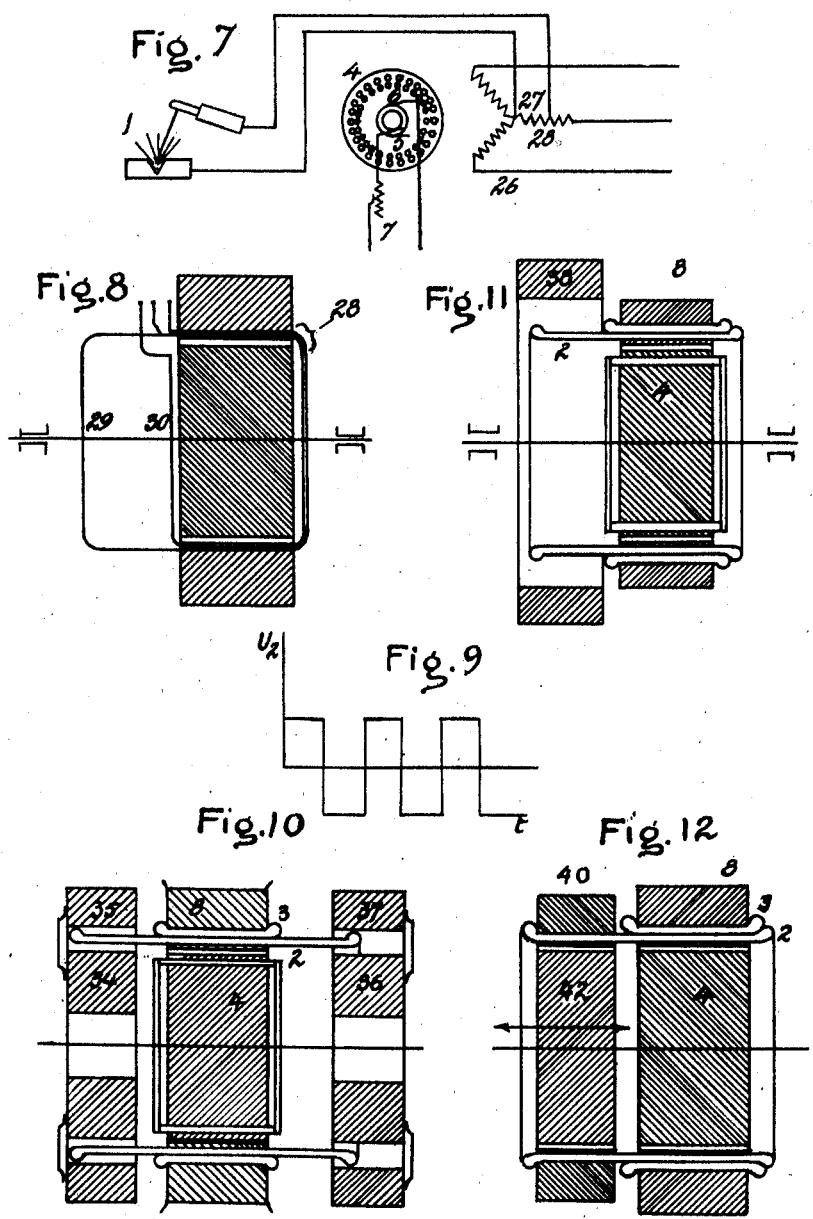

Patented Nov. 5, 1929

1,734,042

UNITED STATES PATENT OFFICE

MARCEL MONEYRON, OF PARIS, FRANCE

ROTARY TRANSFORMER

Application filed April 9, 1928, Serial No. 268,568, and in France April 21, 1927.

The present invention relates to the construction of an apparatus with internal regulation of the available power for the equilibrated transformation of single-phase or polyphase alternating currents into alternating currents having any number of phases and adapted for the separate supply of single-phase apparatus of the arc type which operate preferably at constant power.

The power expended for the supply of the different arcs is distributed equally over the several primary phases, irrespectively of the functioning of the transformer.

In my prior French Patent No. 626,097 provision is made for the equilibrated transformation of polyphase currents into single-phase currents, for thermic applications of electricity in general, and the uses of the electric arc in particular, with a functioning at constant power in the single-phase secondary circuit.

The constant value of the power in the secondary circuit was obtained in the prior construction by the separation of two windings, primary and secondary, respectively polyphase and single-phase, disposed upon an annular frame of laminated iron, within which is rotatable a rotor carrying a damping winding adapted to equilibrate the load upon the phases of the primary winding.

The special transformer which constitutes the subject matter of the present invention has a much more simple construction than the earlier one, and is based upon the partial use, under load, in a system of single-phase or polyphase windings forming the secondary of the transformer, of the flux produced by another set of single-phase or polyphase windings forming the primary.

The two sets of windings are placed together upon an annular frame consisting preferably of laminated iron, at the interior and the exterior of which is placed another frame carrying an electric damping device equilibrating the load upon the phases of the primary windings in the case in which the loads on the secondary windings are unbalanced.

The appended drawings show by way of example a particular case of the transformation of three-phase currents into single-phase current.

Fig. 1 shows a transformer according to the invention supplying an electric arc welding apparatus.

Fig. 2 is a sectional view of a two-pole transformer.

Fig. 3 shows the turns of the windings.

Fig. 4 is a section on the line IV—IV of Fig. 2.

Fig. 5 is a diagram of an ordinary transformer.

Fig. 6 is a diagram of a transformer according to the invention.

Fig. 7 shows a modified device according to the invention.

Fig. 8 shows the arrangement of the turns of one of the windings.

Fig. 9 shows a curve of the variation of the electromotive force.

Fig. 10 shows a modification of the transformer.

Fig. 11 represents another modification.

Fig. 12 shows a further modification.

Fig. 1 shows a transformer according to the invention adapted for the supply of an electric welding apparatus 1 of the arc type. The three-phase windings of the transformer are shown at 2, the single-phase winding at 3, and the rotor at 4. The rotor 4 carries a damping winding 50, and a winding 51 which is supplied, by means of the slip rings and brushes 5—6, with direct current from a suitable source 7.

Fig. 2 is a sectional view of a transformer wound for two poles, comprising a main frame 8 having radial slots 9 adapted to contain the windings 2 and 3 shown in Fig. 1. The rotor 4 has projecting poles and comprises a damping element 10 of the squirrel cage type, and an exciting winding 11 for direct current. It should be noted that only a portion of the slots 9 is shown in Fig. 2.

The partial use of the primary flux in the active secondary winding is based upon the difference in the respective cross-sectional areas enclosed by the turns of the primary and the secondary windings, as shown in Fig. 3. The secondary turn 12 forming part of the secondary winding 3 of Fig. 2, with its connections 14, encloses solely the iron section of the rotor 4, whilst the turn 13 forming part of the primary winding 2, with its connections 15, encloses both the iron section of the rotor 4 and an adjacent air gap. In the construction illustrated, the area of the air gap is almost equal to the area enclosed by a turn of the secondary winding and therefore is almost half of the area enclosed by a turn of the primary winding.

In Fig. 4 is shown the difference in width and hence in area of the turns of the windings 2 and 3. This difference might be distributed equally on both sides of the frame 8.

The reluctance of the magnetic circuit of the secondary winding 3 is due solely to the iron and the air gap of the transformer, whilst the reluctance of the primary winding 2 also comprises the reluctance of the section of the air gap. At no load, the constant primary supply tension produces a primary flux, constant and rotating, whose magnetic circuit comprises the circuit 17 in the air gap and the circuit 16 in the iron. The ratio of the reluctances of these two circuits is quite considerable, since the iron of the transformer is not saturated, and the major part of the primary flux thus passes through the secondary winding 3.

When the secondary circuit 3 is closed by the arc 1 of Fig. 1, the secondary current which is thus produced tends to prevent the passage of the primary flux in the path 16. This effect is the physical equivalent of an increase in the reluctance of the magnetic path 16, i. e. of a decrease in the ratio of the reluctances of the paths 17 and 16, and to a diminution of the effective primary flux traversing the secondary of the transformer.

In the general diagram shown in Fig. 5, 20 is the secondary electromotive force on load, 21 the direction of the secondary current $i$, 22 the ohmic drop of tension $Ri$, 23 the reactive drop of tension $Li$, and 24 the electromotive force at no-load. If this diagram is applied to the transformer shown in Fig. 4, I obtain the diagram shown in Fig. 6, it being observed that the phase angle between the secondary tension and current equals zero. The characteristic of the secondary current relative to the E. M. F. at load is thus given by the arc 25 of Fig. 6, showing that for values of the starting tension 24 comprised between two and three times the tension on load 20 at the terminals of the arc, the power may be considered as practically constant in the arc.

Fig. 7 is a diagram of another arrangement according to the invention, in which the principle of auto-transformers is employed. The primary three-phase windings are indicated at 26, and a shunt 27 is taken from a phase 28 of primary 26 to supply the welding apparatus 1. The rotor 4 is of the same type as the one shown in Fig. 1.

A certain number of shunts may be taken from the different phases, in case several arc apparatus are to be supplied.

Fig. 8 shows the arrangement of the turns of the winding of the phase 28 of Fig. 7, the turn 30 corresponding to the turns 27 and the turn 29 to the other turns of the phase 28.

It is obvious that the turns 29 and 30 of Fig. 8, as well as the turns 12 and 13 of Fig. 3, may be of any number in order to obtain the desired secondary tension. The part of the said turns situated in the air gap is shown in the figures in a rectangular form, but the invention is not limited to this particular disposition.

The other two phases of the three-phase winding 26 may be wound either in long turns analogous to 29 or in short turns analogous to 30.

To facilitate the work of the operator, it is necessary in the electric welding process to obtain a ready starting of the arc, and in the case of alternating currents this can only be effected by means of an E. M. F. curve analogous to the one shown in Fig. 9, in which the changes of polarity are very abrupt.

The partial use of the primary flux aids in obtaining this curve. This result can be still further aided by a suitable winding of the turns with the use of one slot per pole and per phase. The present invention is not limited to this special case, and it is obvious that I may employ any number and form of slots per pole and per phase, as well as any disposition of the turns in the slots and any form for the ends of the coils.

The rotor 4 of the special transformer shown in Figs. 1 and 7 may be of the type with projecting poles as shown in Fig. 2, or of the cylindrical type analogous to what is employed in the known asynchronous motors. It carries at the periphery a conducting element 50 of great conductivity which consists of a short-circuited winding, a squirrel cage arrangement, or a copper cylinder. The rotor 4 may also carry a winding energized by direct current, for increasing the power factor of the transformer. The width of the rotor 4 may be equal to the width of the secondary turns 3, or to the width of the primary turns 2. As shown in Fig. 4, the width of the rotor 4 is equal to the width of the frame 8.

For the fusion of electrodes of different diameters the arc welding apparatus requires variable currents and hence variable power in the secondary windings. For this purpose, several devices have been illustrated which depend upon a variation in the partial use of the primary flux on load.

The first arrangement comprises the transformer shown in Fig. 1 by way of example, and herein I vary the primary inductance by varying the number of the primary turns.

The number of secondary turns may also be made variable in order to maintain a constant ratio of transformation.

Fig. 10 is a diagrammatic view of a transformer according to the invention which comprises the three-phase windings 2 equally spaced on either side of the frame 8, a single-phase winding 3, and a rotor 4. The value of the available secondary power is regulated by displacing by a suitable means and on the axis of the machine the two concentric sets of laminated iron rings 34 and 35, 36 and 37, respectively. Should the rotor have the same width as the primary turns, the rings 35 and 37 will suffice for the adjustment.

Fig. 11 is a diagrammatic view of a transformer adapted to be regulated by means of a laminated ring 38 slidable on the outer part of the frame 8. The internal diameter of the ring 38 is the same as the outer diameter of 8.

For the starting of the rotor of the transformer the arrangement according to the present invention is directly available. In fact, with reference to Fig. 4, the leakage magnetic circuit 17 increases the primary self induction, so that the rotor will start as in an ordinary squirrel cage motor connected to an auto-transformer.

In order to increase the torque at starting, the cores shown in Fig. 10 may be provided with a squirrel cage having a resistance, and for the starting I place the cores 34 and 36 respectively opposite the frames 35 and 37.

It should be observed that the said transformer may be employed as a motor of the induction type.

Finally, the most important arrangement according to the invention is shown in Fig. 12, in which the primary winding is wound upon two stators 8 and 40, and the secondary winding is wound only on the stator 8.

The machine comprises two rotors, whereof one rotor 4 is of the squirrel cage type and has but little ohmic resistance, it being mounted on the shaft, and the other rotor 42 is a squirrel cage with a great resistance movable according to the axis of the machine and revolving in the air space.

I may eliminate the squirrel cage part of the rotor 42 while remaining within the limits of the invention.

It is obvious that the present invention may comprise one or more of the devices herein specified, or in general all means whereby the ratio of the reluctance of the magnetic circuits 16—17 of Fig. 4 may be varied.

Although the aforesaid devices have been described with reference to the case of a three-phase-single-phase transformer of the two-pole type, they may be adapted to polyphase transformers having any number of poles and providing several secondary currents used for several arcs.

The said invention is further applicable to the transformation of a single-phase current into single-phase current or into polyphase currents of constant power, as well as to the special arrangement of a transformer whose rotor carries the primary and secondary windings, whilst the stator carries the damping device.

The invention has been described with reference to a primary winding 2 longer than the secondary winding 3, but it is evident that I may reverse these two windings and make 2 the secondary winding and 3 the primary winding.

I claim:

1. A balanced alternating-current transformer comprising a stationary magnetic element; a rotary element concentric with the stator; a damping winding wound on one of said elements, the other element having slots formed therein; and two polyphase windings wound in said slots and in close inductive relation with each other in each slot, the turns of one of said windings forming a geometrical figure which projects laterally beyond the figure formed by the turns of the other winding.

2. A balanced alternating-current transformer comprising a stationary magnetic element; a rotary element concentric with the stator; a damping winding wound on one of said elements, the other element having slots formed therein; two polyphase windings wound in said slots and in close inductive relation with each other in each slot, the turns of one of said windings forming a geometrical figure which projects laterally beyond the figure formed by the turns of the other winding; and movable magnetic members cooperatively associated with said laterally-projecting winding portion.

In testimony whereof I affix my signature.

MARCEL MONEYRON.